Dec. 4, 1956 R. F. NEFF 2,772,912
COMBINATION BOAT CARRYING AND HOUSE TRAILER
Filed Aug. 23, 1954 2 Sheets-Sheet 1

INVENTOR.
ROBERT F. NEFF.
BY
William S. Groen
ATTORNEY.

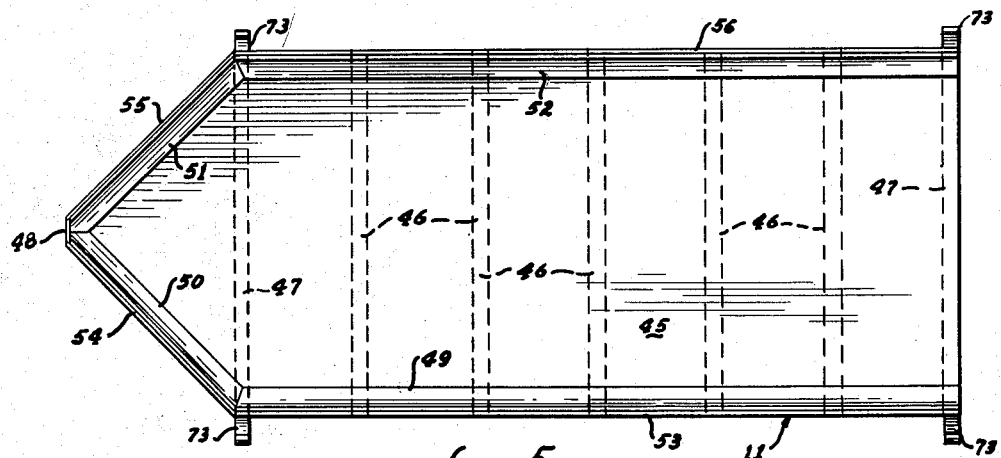
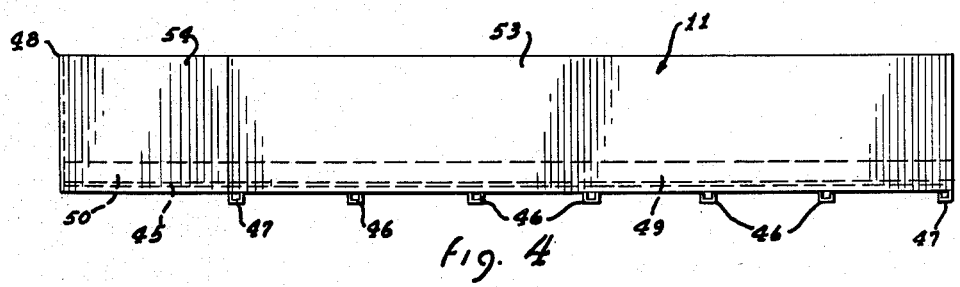
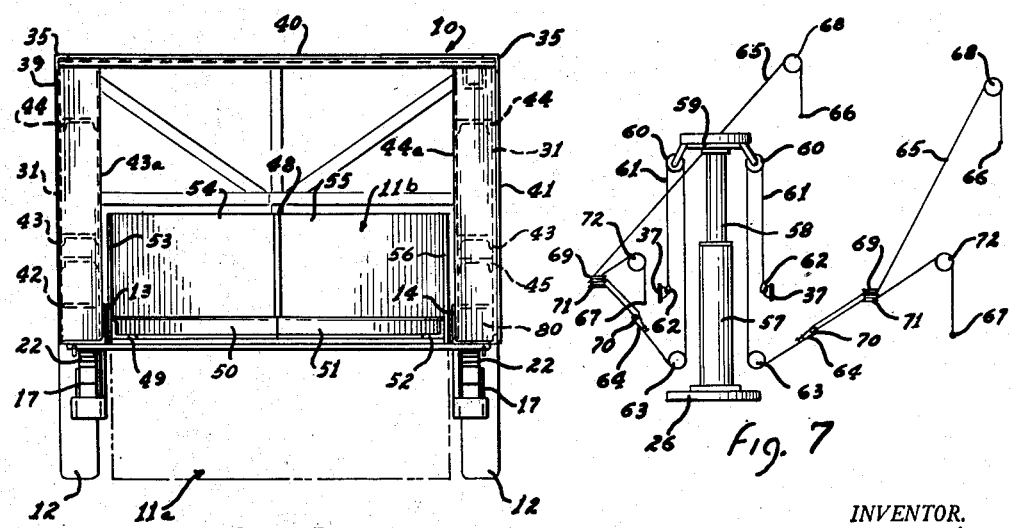

United States Patent Office 2,772,912
Patented Dec. 4, 1956

2,772,912

COMBINATION BOAT CARRYING AND HOUSE TRAILER

Robert F. Neff, Phoenix, Ariz.

Application August 23, 1954, Serial No. 451,498

4 Claims. (Cl. 296—23)

This invention pertains to improvements in trailers and is particularly directed to an improved combination boat carrying house trailer of telescopic type.

One of the objects of this invention is to provide an improved combination boat carrying and living house trailer which may be readily adapted for carrying a boat or similar equipment but which may be quickly put into use as a regular house trailer.

Still another object of this invention is to provide a telescopic trailer which may be raised for carrying a boat or other equipment but which may be easily and quickly lowered or expanded downwardly to provide living quarters with sufficient standing room to form an excellent house trailer while the wall portions of the trailer frame are utilized for the storage of equipment and housekeeping supplies.

Still another object of this invention is to provide an improved telescopic trailer having a main inverted U-shaped frame and an upright U-shaped bed portion telescopically mounted in said frame which may be lowered from a road traveling position to a ground position to convert the trailer from a load-carrying device to a house trailer for living purposes.

Still another object of this invention is to provide a telescopic house and load-carrying trailer having a raising and lowering bed portion for converting the trailer from load-carrying purposes while traveling over the road to a lowered ground position for automatically converting the trailer into living quarters.

Further features and advantages of this invention will appear from a detailed description of the drawings in which:

Fig. 3 is a rear end elevation of the trailer shown in Figs. 1 and 2.

Fig. 4 is a side elevation of the raising and lowering floor and bed portion of the trailer.

Fig. 5 is a plan view of the bed shown in Fig. 4.

Fig. 7 is a diagram of the cable raising and lowering mechanism of the bed of the trailer.

Figure 2:
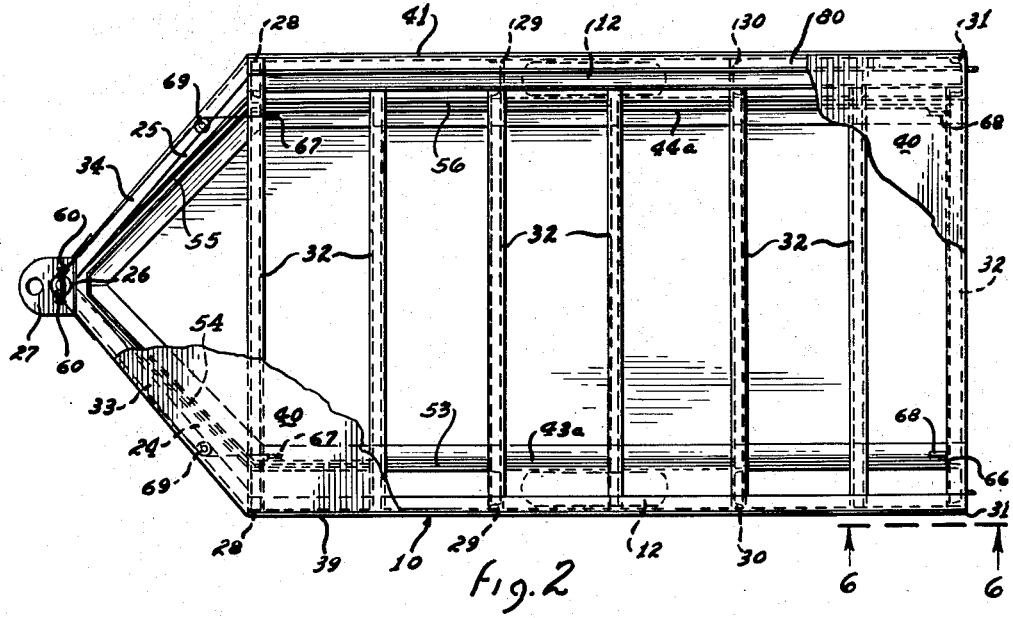
Fig. 2 is a plan view of a trailer shown in Fig. 1.
Figure 1:
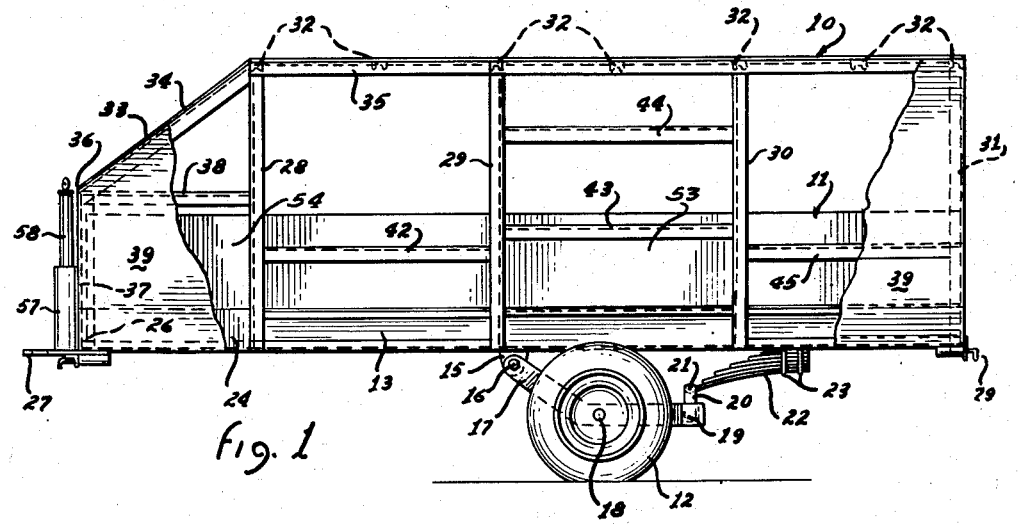
Fig. 1 is a side elevation of a combination boat and house trailer incorporating the features of this invention.

As illustrative of one embodiment of this invention there is shown a combination boat and house trailer comprising the main frame 10 and the vertically movable bed 11, the frame being carried on the usual road wheels 12. The main frame 10 comprises the side rails 13 and 14 to which are fixed the shackles 15 which carry the pivot pins 16 upon which are pivotally mounted the road wheel carrying arms 17 to which are fixed the spindles 18 upon which are suitably journaled the road wheels 12. The rear portions of the arms 17 are pivotally connected at 19 to a link 20 and a pin 21 to a suitable spring 22 secured by U-bolts 23 to the rails 13 and 14 of the frame 10.

The main frame 10 has its side rails 13 and 14 connected to converging rails 24 and 25 which are rigidly secured to the forward portions of the rails 13 and 14 and are connected together rigidly with the hitch plate 26 to which is fixed the usual hitch member 27 for attachment to the vehicle. Also, fixed to the side rails 13 and 14 are the upright frame members 28, 29, 30 and 31 which terminate at their top portions rigidly with the roof forming members 32 so as to form an inverted U-shaped framework. Downwardly converging struts 33 and 34 extend from the front ends of the corner angle members 35 at each side of the roof forming members 32 and extend downwardly and are rigidly connected at 36 to the vertical piece 37 which in turn is secured to the converging rail members 24 and 25. Additional support pieces 38 may be interconnected between the vertical members 28 and the point 36 for greater rigidity of the structure.

The entire structure thus recited may be covered with a suitable metallic skin or the like as indicated at 39, 40 and 41 so as to comprise a completely enclosed inverted U-shaped frame. It is also contemplated to place various support and shelf-forming pieces such as indicated at 42, 43, 44 and 45 for additional rigidity and for providing storage space between the outside skin 39–41 and the corresponding inner surfaces 43 and 44 of the U-shaped frame 10. In connection with this feature it is important to note that the width of the side frames formed by the side rails 13 and 14, the upright members 28, 29, 30 and 31 and the various shelf pieces 42, 43, 44 and 45 are of such a width as to accommodate the width of the road wheel 12 and the wheel carrying arms 17 while at the same time providing an important storage space in the trailer for any position of the raising and lowering bed structure which will now be described.

Referring particularly to Figs. 4 and 5 there is shown the bed structure comprising the floor 45 which is made rigid by suitable cross pieces 46 and end pieces 47, the front portion of the floor converging at the point 48 so as to conform to the inside configuration of the U-shaped frame such as shown in Fig. 2. Suitable angle pieces 49 are secured to the floor portion 45 and support rigidly the side walls respectively at 53, 54, 55 and 56 of the bed which walls nicely slide in between the surfaces 43 and 44 of the trailer frame 10.

A cable elevating and lowering system is provided for the bed illustrated in Figs. 4 and 5 as best shown by reference to the diagram of Fig. 7. In this arrangement a fluid pressure cylinder 57 is secured to the hitch plate 26 and has a vertically disposed piston rod 58 to the upper end of which is fixed a cross head 59 which carries a pair of cable pulleys 60 over which passes the operating cables 61 which have their ends 62 rigidly attached to the member 37 of the frame 10. The cables 61 pass over the pulleys 60 and then downwardly over the pulleys 63 journaled on the frame member 37 and then extend horizontally and rearwardly along the converging rail members 24 and 25 where they are provided with loops 64 at some point intermediate the ends of the members 24 and 25. To the front and rear portions of the bed 11, at each side thereof, are the lifting cables 65 which are connected at 66 and 67 to raise and lower the bed 11. These cables 65 extend from the connection point 66 upwardly over the pulleys 68 suitably journaled on the frame 10 and extend forwardly over the pulleys 69 journaled on a vertical axis at the forward portion of the frame 10 and extend in loop fashion at 70 through the loops 64 of the cable 61 and then back over additional pulleys 71 journaled on the same axis as the pulleys 69 on the frame 10 and then over the pulleys 72 and finally downwardly to the connection 67 with the bed 11 of the trailer. Thus, by applying fluid pressure in the cylinder 57 to raise the piston rod 58 the cables 65 will be drawn upwardly to lift the connection points 66 and 67 and the bed 11 upwardly into the trailer to the position shown at 11b in Fig. 3. When pressure is released from the cylinder 57 to allow the piston rod 58 to return downwardly, the cables 65 will be released to allow the bed 11 to be lowered to ground engaging position 11a as best seen in Fig. 3.

Figure 6:
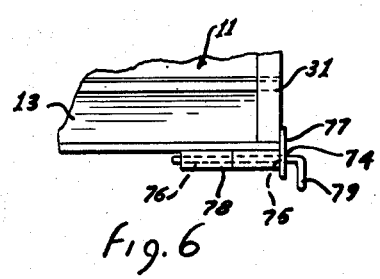
Fig. 6 is an enlarged fragmentary view on the line 6—6 of Fig. 2 showing one of the locking devices for the bed when in raised road-traveling position in the trailer frame.

When in raised position the end cross members 47 of the bed 11 having the extended portions 73, engage the under side of the side rails 13 and 14 at the front and rear portion thereof so as to bring their locking holes 74 into alignment with mating holes 75 and 76, Fig. 6, in the respective lug pieces 77 and 78 secured to the side rails 13 and 14 of the frame 10 so that lock pins 79 may be inserted to secure the bed 11 in its upward road-traveling position. Utilizing the locking devices just described the cables 65 are released of any load carrying during road-traveling and further, the cross members 47 securely lock the lower portions of the side frames of the U-shaped trailer frame rigidly together so that side strain on the road wheels will have no effect in spreading or wedging the sides of the trailer structure together when traveling over the road.

It is also practical to include a rolled canvas in the longitudinally extending pocket 80 in the side frame 41—44 if desired which may be pulled out and stretched on suitable supports to give a canopy to the side of the trailer for additional living space and sun and rain protection.

There has thus been provided a combination trailer structure having telescopic characteristics in which the bed member 11 can be raised or lowered from positions 11a or 11b by manipulation of the power device 57. Further, it will be noted that when the bed is in lowered position the sides automatically expose the compartments formed by the shelf members 42, 43, 44 and 45 to render immediately accessible supplies kept in the frames 39—43 and 41—44.

It will be further noted that as the bottom or bed 11 is moved to raised position the various shelving and compartments in the side frames are closed so that the materials stored therein are automatically held and locked into position. Further, when in raised position a boat may be placed in the trailer and on the floor of the bed 11 for road-traveling position with the boat completely enclosed by the trailer sides of the top. And it will also be noted that when the bottom is in raised position 11b it automatically locks the side frames together as one rigid box structure.

While the apparatus herein disclosed and described constitutes a preferred form of the invention, it is also to be understood that the apparatus is capable of mechanical alteration without departing from the spirit of the invention and that such mechanical arrangement and commercial adaptation as fall within the scope of the appendent claims are intended to be included herein.

Having thus fully set forth and described this invention what is claimed and desired to be obtained by United States Letters patent is:

1. In a trailer having a main frame, a vertically movable bed, road wheels on said frame, and power means to vertically reciprocate said bed, a pair of horizontally disposed side rails on said frame, wheel carrying arms pivotally and resiliently mounted on said side rails having means to rotatably mount said road contacting wheels within the sidewise confines of said side rails, upstanding hollow wall frames on said side rails, a roof carried on said wall frames, outside wall panels secured to the outside faces of said wall frames, a floor in said bed, side walls rigidly secured to said bed closely fitting between the inside faces of said wall frames of said main frame so as to form a closure for the spaces in said hollow wall frames when said bed is in raised position, end cross members fixed transversely under the bottom of said bed, lug pieces on said side rails, and locking pins adapted to secure said cross members to said side rails to support said bed in raised position and restrain said side rails against relative horizontal transverse movement.

2. A combination load carrying and house trailer comprising a rigid inverted U-shaped frame having side rails, road wheels mounted on said side rails within the lateral confines thereof, hollow side walls mounted on top of and of substantially the same thickness as said side rails, wall panels fixed on the outside of said side walls, supply storage compartments in said side walls normally open to the interior of said U-shaped frame, a bed having a bottom and sides rigidly attached closely slidingly fitting between the open inside faces of said hollow side walls of said main frame to expose said storage compartments for access when said bed is in lowered ground-contacting position for house trailer use, said sides of said bed forming a closure for said compartments when in raised road traveling position, end cross members fixed transversely under the bottom of said bed, lug pieces on said side rails, and locking pins adapted to secure said cross members to said side rails to support said bed in raised position and restrain said side rails against relative horizontal transverse movement.

3. A combination load carrying and house trailer comprising a rigid inverted U-shaped frame having side rails, road wheels mounted on said side rails within the lateral confines thereof, hollow side walls mounted on top of and of substantially the same thickness as said side rails, wall panels fixed on the outside of said side walls, supply storage compartments in said side walls normally open to the interior of said U-shaped frame, a bed having a bottom and sides rigidly attached thereto, said sides closely slidingly fitting between the open inside faces of said hollow side walls of said main frame so as to expose said storage compartments for access when said bed is in lowered ground-contacting position for house trailer use, said sides of said bed forming a closure for said compartments when in raised road-traveling position, a power actuator on said frame, cable actuating means connected between said power actuator and said bed for vertical movement of said bed on said frame, end cross members fixed transversely under the bottom of said bed, lug pieces on said side rails, and locking pins adapted to secure said cross members to said side rails to support said bed in raised position and restrain said side rails against relative horizontal transverse movement.

4. A combination load carrying and house trailer comprising a rigid inverted U-shaped frame having side rails, road wheels mounted on said side rails within the lateral confines thereof, hollow side walls mounted on top of and of substantially the same thickness as said side rails, wall panels fixed on the outside of said side walls, supply storage compartments in said side walls normally open to the interior of said U-shaped frame, a bed having a bottom and sides rigidly attached thereto, said sides closely slidingly fitting between the open inside faces of said hollow side walls of said main frame so as to expose said storage compartments for access when said bed is in lowered ground-contacting position for house trailer use, said sides of said bed forming a closure for said compartments when in raised road traveling position, a power actuator on said frame, cable actuating means connected between said power actuator and said bed for vertical movement of said bed on said frame, a locking means connectable between the outer ends of said bed and said side rails of said frame when said bed is in raised position on said frame, said locking means including end cross members fixed transversely under the bottom of said bed, lug pieces on said side rails, and locking pins adapted to secure said cross members to said side rails to support said bed in raised position and restrain said side rails against relative horizontal transverse movement.

References Cited in the file of this patent

UNITED STATES PATENTS

| | | |
|---|---|---|
| D. 158,875 | Lindig | June 6, 1950 |
| 1,801,645 | Sherman | Apr. 21, 1931 |
| 2,274,754 | Theisen | Mar. 3, 1942 |
| 2,452,937 | Krake | Nov. 2, 1948 |
| 2,478,424 | Reid | Aug. 9, 1949 |
| 2,543,349 | Britton | Feb. 27, 1951 |